Nov. 12, 1946.  C. N. REAVIS  2,410,998
ELECTRIC SPEED CONTROL AND MOTOR PROTECTOR
Filed Sept. 11, 1943  3 Sheets-Sheet 2
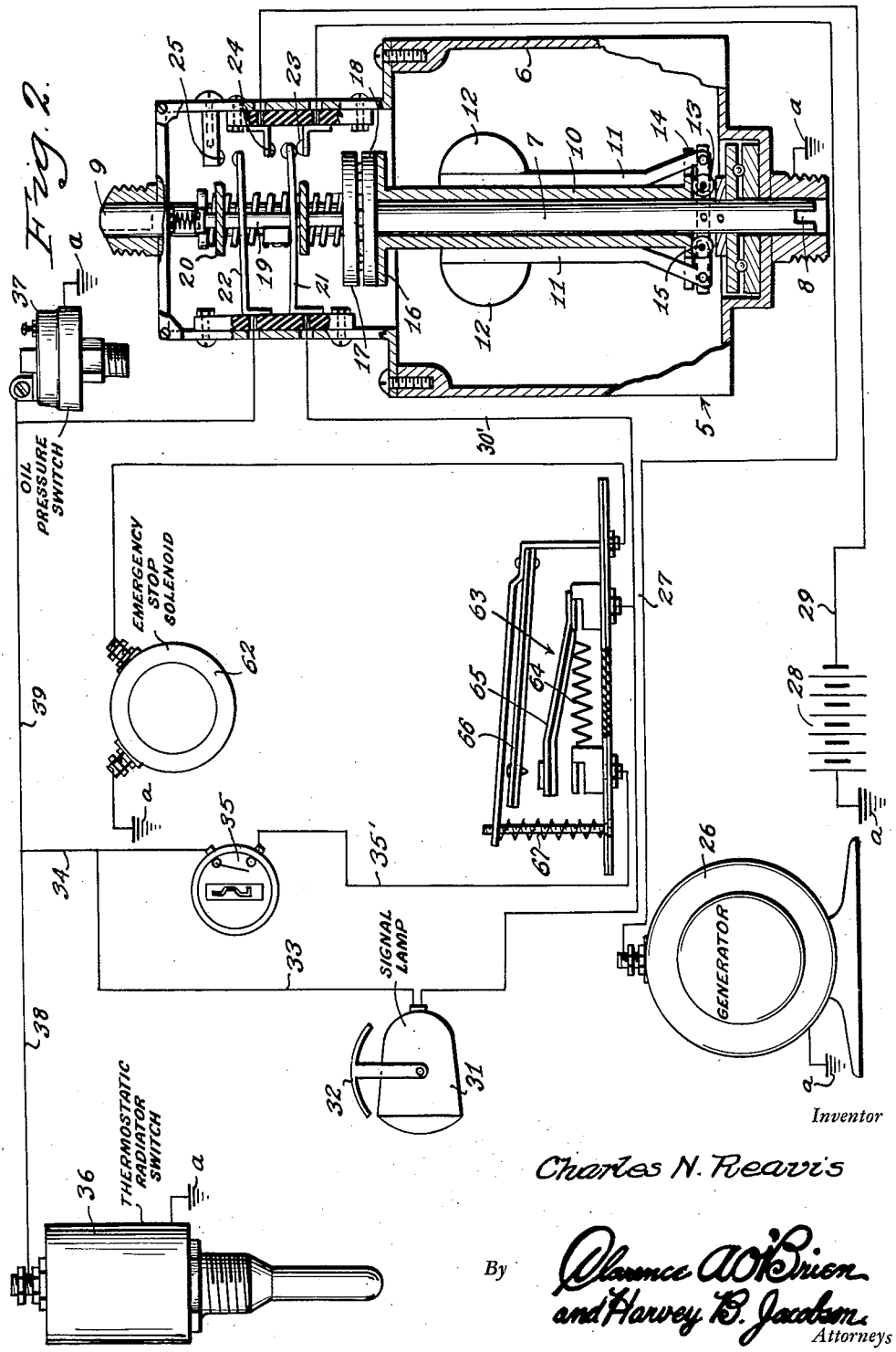
Inventor
Charles N. Reavis
By Clarence A. O'Brien
and Harvey B. Jacobson
Attorneys Nov. 12, 1946.  C. N. REAVIS  2,410,998
ELECTRIC SPEED CONTROL AND MOTOR PROTECTOR
Filed Sept. 11, 1943   3 Sheets-Sheet 3
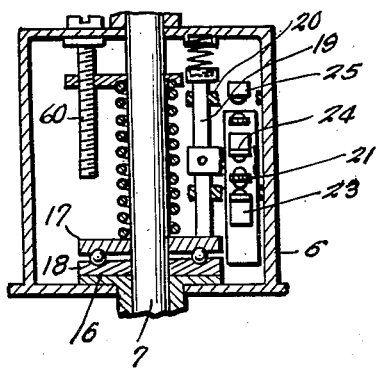
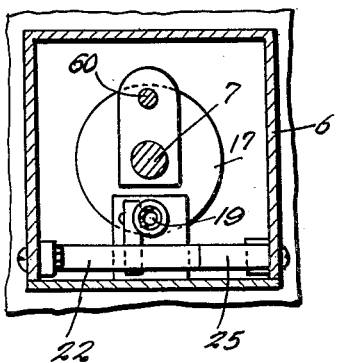
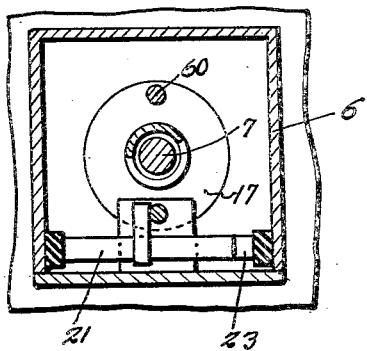
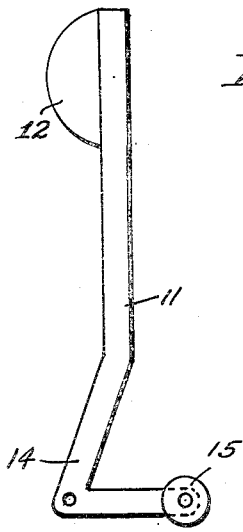
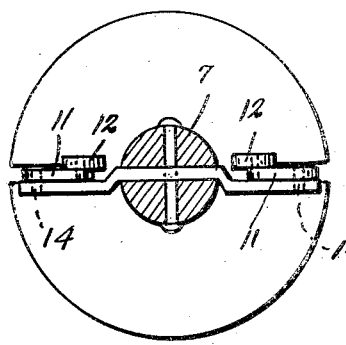
Inventor
Charles N. Reavis
By
Attorneys Patented Nov. 12, 1946

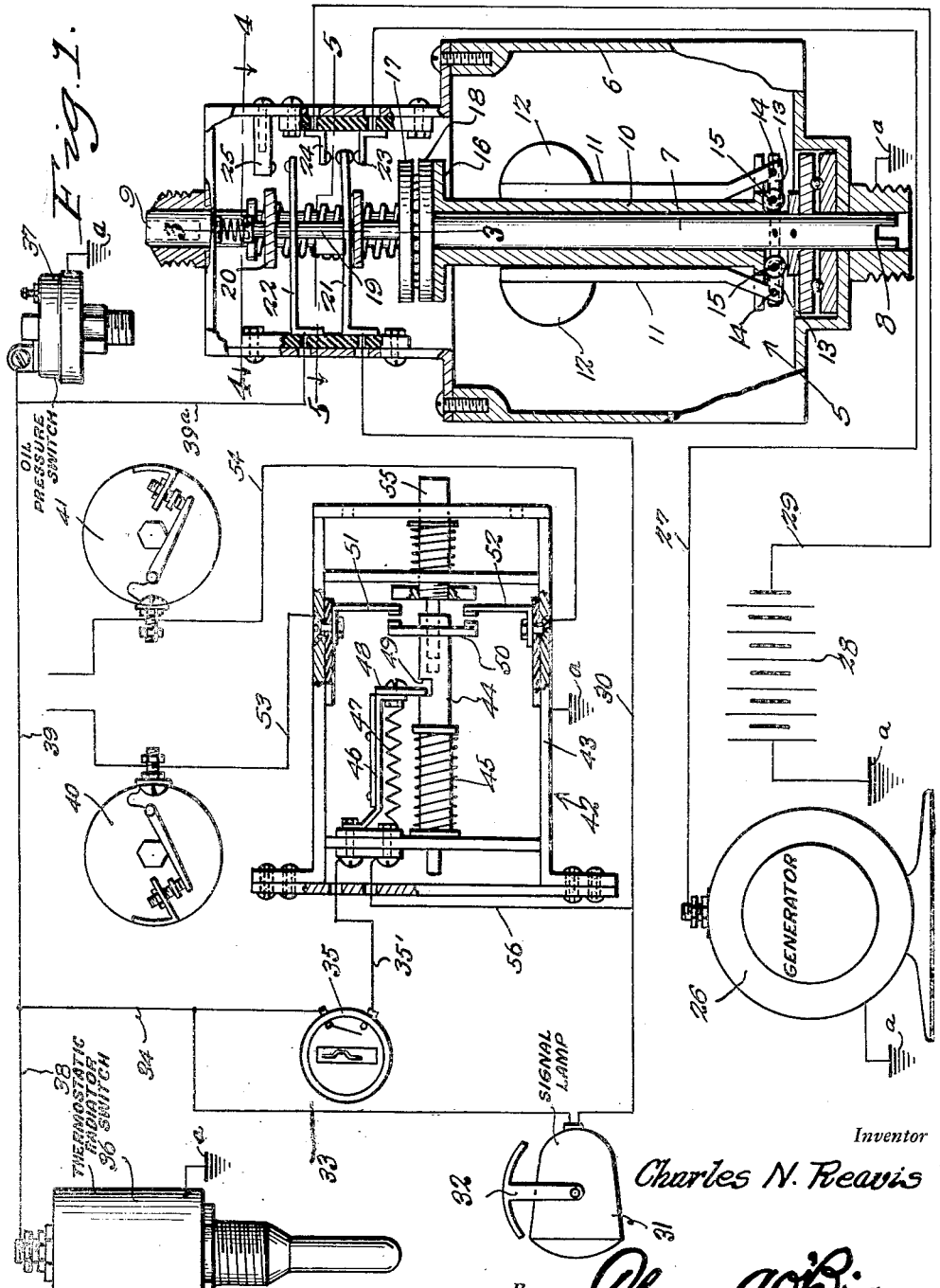

2,410,998

UNITED STATES PATENT OFFICE 2,410,998

ELECTRIC SPEED CONTROL AND MOTOR PROTECTOR

Charles N. Reavis, Raleigh, N. C., assignor of two-thirds to Silas B. Coley, Raleigh, N. C.

Application September 11, 1943, Serial No. 502,012

4 Claims. (Cl. 180—82.1)

This invention relates to new and useful improvements in control systems for motor vehicles and more particularly to a vehicle speed control and motor protector.

The principal object of the present invention is to provide an electric system for protecting an engine from damage when lubricating or cooling systems fail.

Another important object of the invention is to control the speed of a vehicle by cutting out some essential operating parts thereof.

Still another important object of the invention is to provide a warning signal for a vehicle driver to warn him as he reaches a certain predetermined speed.

Other objects and advantages of the invention will become apparent to the reader of the following description.

In the drawings:

Figure 1 represents a diagrammatic view showing the electrical connections between the electrical devices that are to be employed when the system is utilized in conjunction with gasoline engines.

Figure 2 is a diagrammatic view showing the electrical connections between the electrical devices involved when the system is used in conjunction with the Diesel motor.

Figure 3 is a fragmentary vertical sectional view taken on the line 3—3 of Figure 1.

Figure 4 is a section taken on the line 4—4 of Figure 1.

Figure 5 is a section taken on the line 5—5 of Figure 1.

Figure 6 is a section through the governor.

Figure 7 is a side elevational view of one of the governor arms.

Referring now to Figure 1 wherein like numerals designate like parts, it can be seen that numeral 5 denotes a governor unit which is interposed in the usual drive to a speedometer (not shown) and this comprises a case 6 having a shaft 7 disposed therein and having suitable connecting accommodations at the ends 8, 9. The device in no way interferes with the normal operation of the speedometer.

On the shaft 7 is a slidable sleeve 10.

Governor arms 11, 12 provided with weights have bell-crank arms 13 fulcrumed as at 14 and having rollers 15 which are operative against the lower end of the sleeve 10.

The upper end of the sleeve 10 has a flange 16 and above this flange 16 are a pair of disks 17, 18 between which are ball bearings or the like. Rising from the upper disk 17 is a pin 19 disposed through several guides 20 and abutments are provided on this pin 19 for operating a pair of spring contact fingers 21, 22, the contact finger 21 being alternately operative against contacts 23, 24, while the contact finger 22 is operative against a grounding contact 25.

Numeral 26 denotes an ordinary automotive generator. A conductor extends from the binding post of the generator to contact 23.

Numeral 28 denotes an ordinary storage battery on the motor vehicle and this has a lead 29 to the contact 24.

From the contact finger 21, a conductor 30 extends to a warning light 31, which may have a light shield 32, and from this warning light 31, a wire 33 extends to connect to a wire 34, one side of which connects to one side of a lock switch 35, while the other end connects to a thermostatic water switch 36 and also to an oil pressure switch 37 by branch wires 38, 39, respectively.

As it is to be understood that this particular system is used in conjunction with gasoline motors, a distributor or distributors 40, 41 will be used and in conjunction with this is employed a time delay switch generally referred to by numeral 42. The switch 42 consists of a frame 43 having a slide member 44 therein adapted to be urged to the right in Figure 1 by a compression spring 45. In the frame 43 is a bi-metal element 46 adapted to be heated by heating coil 47 and this has a lug 48 normally engaged in a notch 49 of the slide member 44 when the system is operating normally.

The slide member 44 carries a cross member 50 on which are contacts opposed to contacts 51, 52 and these are connected by wires 53, 54 to the feed terminals of distributors 40, 41, respectively. Numeral 55 denotes a reset button for resetting the slide 44 to the lug in the notched position shown in Figure 1. A wire 56 extends from the conductor 30 to one side of the heat coil 47, while the other side of the heat coil 47 is connected to the bi-metal element 46. The bi-metal element 46 is, in turn, connected to the opposite side of the switch 35.

It can now be seen, that when the vehicle is at a standstill, current for the system is obtained from the generator 26, but when the vehicle begins to move and attains a speed of from 15 to 18 miles per hour, the governor arms 11 of the speed control unit 5 begin to open which moves the sleeve 10 upward permitting the contact finger 21 to make contact with the contact 24 and this serves to transfer the current supply from the generator 26 to the battery 28, so that current will now be available from the battery 28 along the conductor 29 to the unit 5.

When the vehicle has attained a speed which has been predetermined by the setting of an adjusting screw 60, the contact finger 22 engages the grounding contact 25 due to a further lifting of the sleeve 19, thus grounding the system and causing the warning light 31 to energize. At the same instant current is passed through the heating coil 47 and bi-metal element 46 warps upwardly to disengage the lug 48 from the notch 49 with the result that the spring 45 shifts the slide 44 to the right engaging the contact 50 with the contacts 51 and 52 to ground distributors 40 and 41 and render the engine inoperative. It will here be noted that this forces the driver to drive below a predetermined vehicle speed.

When there is a failure of the cooling system and the temperature rises to say 211° Fahrenheit, the thermostatic switch 36 acts to ground the circuit which results in energization of the warning light 31, and operation of the mechanism results in stopping of the motor.

When there is a failure of the lubricating system causing the oil pressure to drop below five pounds or any predetermined setting, oil pressure switch 37 acts to ground the system and this results in energization of the signal light 31, and operation of the mechanism results in the stopping of the motor.

The switch 35 allows the operator to maintain the system in condition for operation of the vehicle in spite of the fact that the system has operated properly. Obviously, the driver could not afford to have the engine stop on such places as railroad tracks, bridges, etc. For this purpose the switch 35 is employed. This switch normally is closed, but it is of a type so constructed that it may be opened by a simple push thereon to break the circuit of the heating coil 47, even though the signal light continues to burn, but it is preferable that this be a lock type switch so that when it is actuated it will remain locked in circuit opening position until unlocked by the proper person. It is pointed out that the battery 28 may be the one ordinarily used for the starting, lighting and ignition systems of the vehicle.

Assuming that the parts are disposed as shown in Figure 1 except that switch 35 is closed, that the engine is running at higher than idling speed, and that the vehicle is at a standstill or travelling at a speed of less than 15 to 18 miles per hour, overheating of the water in the engine cooling system will cause switch 36 to close the circuit of heating coil 47 and that of signal lamp 31. This causes heating of element 46, warns the operator that a condition has arisen which will be detrimental to the engine if the latter is allowed to continue to operate and indicates the fact that the engine will be rendered inoperative within a short time. At this time, current flows from generator 26 through wire 27, contact 23, contact 21, wire 30, lamp 31, wires 33, 34 and 38, and switch 36 to ground a. Current also flows from wire 30 through wire 56, coil 47, element 46, switch 35, wires 34 and 38 and switch 38 to ground a. In a short time, element 46 will be heated sufficiently to cause it to flex so that lug 48 is disengaged from member 44, thereby permitting spring 45 to move member 44 so as to cause contacts 51 and 52 to be bridged by member 50. The latter operation short circuits distributors 40 and 41 by causing the ignition current to flow to ground a from the feed terminals of the distributors through wires 53 and 54, contacts 51 and 52, members 50 and 44, and casing 43, thereby stopping the engine. The same operation takes place when the vehicle travels above 15 to 18 miles per hour, except the current is derived from battery 28 instead of generator 26 by reason of disengagement of contact 21 from contact 23 and engagement of the same with contact 24. The same operation also takes place when the oil pressure in the engine lubricating system unduly lowers so as to allow switch 37 to close, the current then flowing from wire 34 to wire 39 and switch 37 to ground a. Should the safety of the vehicle or its operator be jeopardized by stopping the engine, the operator can prevent the device from functioning by opening switch 35 and thereby breaking the circuit of the heating coil 47 before element 46 has become heated sufficiently to disengage lug 48 from member 44. When the contact 22 engages contact 25, lamp 31 is lighted because current flows from battery 28 through wire 29, contacts 24 and 21, wire 30, signal lamp 31, wires 33, 34, 39 and 39a, contacts 22 and 25, and casing 6 to ground a. At the same time, current flows from wire 30 through wire 56, heating coil 47, element 46, switch 35, wires 34, 39 and 39a, contacts 22 and 25, and casing 6 to ground a so as to close the circuit of coil 47, thereby causing the engine to be stopped within a short time, due to short circuiting of the distributors as described above, and unless the speed of the vehicle is properly reduced before such short circuiting occurs. Thus, inspection will show that the driver has operated switch 35, and he may be required to explain why he has done so and how long he continued to operate the engine after operating such switch.

The system as shown in Figure 2 is substantially the same as that in Figure 1 excepting that this system shown in Figure 2 is especially adapted for use in connection with Diesel engines.

An emergency stop solenoid 62 is employed in place of the distributors shown in Figure 1 and a special time delay switch which is generally referred to by numeral 63 is employed in place of the switch 42 shown in Figure 1.

In Figure 2, the contact finger 21 is connected by wire 30' to a heat coil 64, the latter, in turn, being connected by wire 35' to the lock switch 35. When the heat coil 64 heats up to the desired extent, a bi-metal element 65 rises to engage the contact on a compensator bi-metal element 66, which may be adjusted by a screw 67, and this serves to energize the emergency stop solenoid 62 for throwing the engine out of operation.

The emergency stop solenoid is part of standard equipment on vehicles powered by Diesel engines, the same acting, when energized, to cause, through suitable means, stopping of the engine. This produces the same result as short circuiting the distributors in embodiment of Figure 1, and it is accordingly thought that the circuits can be readily traced in Figure 2 in view of the description thereof in connection with Figure 1.

The reason for obtaining current from the generator is for purposes of testing, giving the engine protection while running at higher than idling speed and the vehicle is standing still, and keeping the system from going into action when the engine is idling and the vehicle is standing still or traveling below a predetermined speed. There are times when the oil pressure in a hot motor with thin oil and loose bearings will fall below five pounds, but by the same token the generator is turning too slow to furnish enough current to make the system operate. When the vehicle attains a moderate speed, the speed control switch transfers the operating current from the generator to the battery as before explained.

It will be seen that if the belt driving the generator were to break, motor protection and speed control would still be provided by the switching of the course of the operating current from the generator over to the battery. It will further be noted that the engine will be rendered inoperative if the vehicle rolls down hill at an excessive speed while out of gear and with the engine idling.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A protective system for a motor vehicle having an engine, comprising a generator, a battery, an electrical engine stopping device including a time delay switch, said switch including a heating coil and means including a thermo-sensitive element under the influence of said heating coil for closing the circuit of said device when said element is heated by said coil, a second switch automatically rendered operative to close the circuit of said heating coil by an undesired operating condition of the engine, and a centrifugal switch responsive to the speed of travel of the vehicle for automatically connecting the generator with said heating coil until the vehicle attains a predetermined speed of travel and for automatically disconnecting said generator from and connecting the battery to the heating coil when the vehicle exceeds said predetermined speed.

2. A protective system for a motor vehicle having an engine, comprising a generator, a battery, an electrical engine stopping device including a time delay switch, said switch including a heating coil and means including a thermo-sensitive element under the influence of said heating coil for closing the circuit of said device when said element is heated by said coil, a second switch automatically rendered operative to close the circuit of said heating coil by an undesired operating condition of the engine, and a centrifugal switch responsive to the speed of travel of the vehicle for automatically connecting the generator with said heating coil until the vehicle attains a predetermined speed of travel and for automatically disconnecting said generator from and connecting the battery to the heating coil when the vehicle exceeds said predetermined speed, and a manually openable lock switch interposed between the heating coil and said second switch, said lock switch requiring unlocking to permit closing thereof.

3. A protective system for a motor vehicle having an engine, comprising a generator, a battery, an electrical engine stopping device including a time delay switch, said switch including a heating coil and means including a thermo-sensitive element under the influence of said heating coil for closing the circuit of said device when said element is heated by said coil, a second switch automatically rendered operative to close the circuit of said heating coil by an undesired operating condition of the engine, and a centrifugal switch responsive to the speed of travel of the vehicle for automatically connecting the generator with said heating coil until the vehicle attains a predetermined speed of travel and for automatically disconnecting said generator from and connecting the battery to the heating coil when the vehicle exceeds said predetermined speed, said centrifugal switch being further operable to close the circuit of said heating coil when the vehicle attains a predetermined excessive speed of travel.

4. A protective system for a motor vehicle having an engine provided with a pressure lubricating system, comprising a generator, a battery, an electrical engine stopping device including a time delay switch, said switch including a heating coil and means including a thermo-sensitive element under the influence of said heating coil for closing the circuit of said device when said element is heated by said coil, a second switch automatically rendered operative to close the circuit of said heating coil when the pressure in the engine lubricating system unduly lowers, and a centrifugal switch responsive to the speed of travel of the vehicle for automatically connecting the generator with said heating coil until the vehicle attains a predetermined speed of travel and for automatically disconnecting said generator from and connecting the battery to the heating coil when the vehicle exceeds said predetermined speed.

CHARLES N. REAVIS.